United States Patent

Anderson et al.

[15] 3,676,377

[45] July 11, 1972

[54] PROCESS FOR PREPARING A THERMOSETTING ACRYLIC ENAMEL MODIFIED WITH CELLULOSE ACETATE BUTYRATE

[72] Inventors: Terry P. Anderson, Swartz Creek; Fred W. Parker, Flint, both of Mich.

[73] Assignee: E. I. du Pont de Nemours and Company, Wilmington, Del.

[22] Filed: Dec. 3, 1970

[21] Appl. No.: 94,987

[52] U.S. Cl. .............................. 260/15, 117/64 R, 117/74, 117/124, 117/127, 117/138.8 E, 117/148, 117/161 C, 260/34.2
[51] Int. Cl. .................................................. C08g 37/32
[58] Field of Search .............................. 260/15, 34.2

[56] References Cited

UNITED STATES PATENTS 2,096,095  10/1937  Finn ................................. 260/34.2
3,382,294  5/1968  Christenson et al. ................. 260/873
3,411,941  11/1968  Lowe et al. ......................... 117/64

Primary Examiner—William H. Short
Assistant Examiner—Edward Woodberry
Attorney—Hilmar L. Fricke

[57] ABSTRACT

The improved process for preparing a thermosetting acrylic enamel modified with cellulose acetate butyrate comprises the following steps:

1. forming pigment chips by mixing pigment particles, cellulose acetate butyrate, and an organic plasticizer on a roll mill having one hot roll and one cold roll;
2. forming a mill base by dissolving the pigment chips prepared in Step (1) in an organic solvent;
3. blending the mill base with an acrylic polymer having free hydroxyl groups and carboxyl groups and with a melamine/formaldehyde resin which has been at least partially reacted with an aliphatic monohydric alcohol having one to four carbon atoms.

8 Claims, No Drawings

PROCESS FOR PREPARING A THERMOSETTING ACRYLIC ENAMEL MODIFIED WITH CELLULOSE ACETATE BUTYRATE

BACKGROUND OF THE INVENTION

This invention relates to a process for preparing thermosetting acrylic enamels and, in particular, to a process for preparing a thermosetting acrylic enamel modified with cellulose acetate butyrate.

Thermosetting acrylic enamels are well known in the art as shown in Frazier U.S. Pat. No. 2,681,897, issued June 22, 1954; Vasta U.S. Pat. No. 3,338,860, issued Aug. 29, 1967; Fisk et al. U.S. Pat. No. 3,365,414, issued Jan. 30, 1968. Thermosetting acrylic enamels modified with cellulose acetate butyrate are shown in Lowe et al. U.S. Pat. No. 3,411,941, issued Nov. 19, 1968 and Parker Belgium Pat. No. 740,845, granted Apr. 27, 1970. In general, there have been problems in dispersing organic pigments in the thermosetting acrylic enamels and some pigments cannot be used in these enamels since they cannot be adequately dispersed. Many of the organic type pigments require substantial amounts of energy to adequately disperse the pigment and the standard techniques of sand-grinding or ball-milling do not adequately disperse these pigments in the enamel vehicle. Hence, certain colors, such as reds, golds and maroons could not be made with these standard techniques to provide high quality coatings. There is a great need in the industry for a practical process to disperse all types of pigments in a thermosetting acrylic enamels to provide a coating that has an excellent depth of color, transparency and glamour.

SUMMARY OF THE INVENTION

The improved process for preparing a thermosetting acrylic enamel modified with cellulose acetate butyrate comprises the following steps:

1. forming pigment chips by mixing a charge of 20-60 percent by weight pigment particles, 30-50 percent by weight of cellulose acetate butyrate having a butyryl content of about 45-55 percent by weight and a viscosity of 25° C. about 1-8 seconds measured according to ASTM-D-1343-56 and about 5-15 percent by weight of an organic plasticizer on a roll mill having one hot roll at about 65°-135° C. and a cold roll at about 0°-30° C. for about 5 to 30 minutes applying about 75-400 foot pounds of work per minute per gram of charge;

2. forming a mill base having a solids content of 20-60 percent by weight by dissolving pigment chips prepared in Step (1) above in a composition which is either an organic solvent for cellulose acetate butyrate or a blend of an acrylic resin compatible with cellulose acetate butyrate and an organic solvent for the acrylic resin and the cellulose acetate butyrate;

3. blending the mill base prepared in Step (2), with an acrylic polymer having free hydroxyl groups and carboxyl groups and with a melamine/formaldehyde resin which has been at least partially reacted with an aliphatic monohydric alcohol having one to four carbon atoms to form an enamel having a pigment to binder ratio of about 2:100 to about 70:100 in which the binder consists essentially of 50-80 percent by weight of the acrylic polymer, 5-50 percent by weight of the cellulose acetate butyrate and 5-50 percent by weight of the melamine/formaldehyde resin.

DESCRIPTION OF THE INVENTION

In the first step of the novel process of this invention, pigment chips are formed by mixing a charge of 20-60 percent by weight of pigment particles with 30-50 percent by weight cellulose acetate butyrate and about 5-15 percent by weight of an organic plasticizer on a standard roll mill which has at least one hot roll at about 65°-135° C. and a cold roll at about 0°-30 C. The ingredients are blended together on the mill for about 5 to 30 minutes applying about 75-400 foot pounds of work per minute per gram of charge. Another expression of the work required for blending the charge is the application of about 4,000-20,000 foot pounds per linear inch of roll per minute.

Preferably, a two roll mill is used wherein the hot roll is held at 90°-100° C. and the cold roll is maintained between 0°-10° C. for about 15 to 20 minutes applying 120-200 foot pounds of work per minute per gram of charge. Generally, the charge is milled until a pencil bead is formed between the two rolls and then the mixture is stripped from the rolls and as stripped from the rolls, the mixture cools and breaks into small particles which are referred to as pigment chips.

The cellulose acetate butyrate utilized in the novel process must have a viscosity of about 1-8 seconds, and preferably, 1-6 seconds, determined at 25° C. according to ASTM-D-1 343-56 and a butyryl content of about 45-55 percent by weight. Sufficient work cannot be applied to low viscosity cellulose acetate butyrate polymers on a roll mill to blend the pigment with the cellulose acetate butyrate, therefore, the cellulose acetate butyrate must be used as a viscosity of at least 1 second and above.

The pigments used to form the chips can be any of the great variety of pigments which are used in coating compositions such as metal oxides, titanium dioxide, zinc oxide and the like, metal hydroxides, metal flakes, metal powders, chromates such as lead chromates, sulfides, sulfates, carbonates, carbon black, silica, chalk, china clay, iron blues, organic reds, maroons, organic dyes and lakes, etc. In particular, the novel process of this invention is useful in forming chips of the following pigments: quinacridone reds, such as magenta quinacridone, irgazine yellows and oranges, phthalocyanine blues and greens.

A variety of organic plasticizers can be utilized, such as phthalate esters, such as butylbenzyl phthalate, dibutyl phthalate, 2-ethylhexylbenzyl phthalate, dicyclohexyl phthalate, dibenzyl phthalate, butylcyclohexyl phthalate, di-2-ethylhexyl ester of hexamethylene diphthalate, di-(methylcyclohexyl) phthalate; other plasticizers can be used such as triphenyl phosphate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide. Polymeric plasticizers which can be used, such as epoxidized soyabean oil, oil free and oil modified alkyds and polyesters, such as polyorthophthalate esters, polyalkylene adipate esters or polyarylene adipate esters.

A mill base is formed by dissolving the above prepared pigment chips in a composition which is either an organic solvent for the cellulose acetate butyrate utilized in the pigment chips or a blend of an acrylic resin and an organic solvent for the acrylic resin and for the cellulose acetate butyrate of the pigment chips. Any acrylic resin which is compatible with cellulose acetate butyrate and the heat reactive condensate of melamine/formaldehyde resin utilized in the coating composition can be used to form the mill base. Typical acrylic resins are copolymers of alkyl methacrylate, alkyl acrylate, hydroxy alkyl acrylate or methacrylate. Small amounts of styrene and 0.1 to about 5 percent of $\alpha,\beta$-unsaturated monocarboxylic acid, such as acrylic acid or methacrylic acid can be used in these polymers.

Typical solvents which can be used to form the mill base and to dilute the coating composition prepared in this invention are, for example, toluene, xylene, butyl acetate, acetone, methylisobutyl ketone, methylethyl ketone, butyl alcohol, isopropanol and other aliphatic, cycloaliphatic or aromatic hydrocarbons, esters, ethers, ketones, and alcohols, such as are conventionally used in coating compositions.

The above prepared mill base is then blended using conventional equipment with an acrylic polymer that has free hydroxyl groups and carboxyl groups and melamine/formaldehyde resin which has at least been partially reacted with an aliphatic monohydric alcohol having one to four carbon atoms. The resulting composition has a pigment to binder ratio of about 2:100 to about 70:100 and the binder consists essentially of 50 to 80 percent by weight of the acrylic polymer, 5 to 50 percent by weight of cellulose acetate butyrate and 5 to 50 percent by weight of the melamine/formaldehyde resin. Preferably, the binder consists essentially of 55 to 70 percent by weight of the acrylic resin, 10 to 30 percent by weight of cellulose acetate butyrate and 10 to 25 percent of the melamine/formaldehyde resin. The resulting coating composition has a film-forming polymer of a solids content of about 10–60 percent, preferably 30–50 percent by weight is utilized and pigment volume concentration of about 0.1–20 percent.

The acrylic polymer used in the process of this invention is prepared by conventional polymerization techniques in which the monomer constituents are blended with any of the aforementioned solvents and a polymerization catalyst and heated to 75°–150° C. for about 2–6 hours to form a polymer that has a relative viscosity of about 1.04–1.10 and preferably, about 1.06–1.09. The "relative viscosity" is the value obtained by dividing the efflux time of a solution of the polymer solution. The efflux times are measured according to the procedure of ASTM-D-445-46-T, Method B, using as the polymer solution 0.25 gram of the polymer in 50 cm. of ethylene dichloride as the solvent. The efflux times are measured at 25° C. in a standard apparatus, sold under the designation of a modified Ostwald Viscometer. About 0.1–4 percent by weight based on the weight of the monomer of polymerization catalyst is used to prepare the acrylic polymer. Typical catalysts are ditertiary butyl peroxide, cumene hydroperoxide, azobisisobutyronitrile and the like.

The acrylic polymer used in this invention contains about 0–25 percent by weight styrene and about 25–55 percent by weight methyl methacrylate. The polymer contains 38–48 percent of a soft constituent which is either an alkyl acrylate or an alkyl methacrylate in which the alkyl group contains two to four carbon atoms. The following are typical monomers used as the soft constituent: ethyl acrylate, propyl acrylate, isopropylacrylate, butyl acrylate, isobutyl acrylate, ethyl methacrylate, propyl methacrylate, isopropyl methacrylate, butyl methacrylate and the like. Butyl acrylate is the preferred soft constituent since it forms a polymer that has excellent physical properties which are particularly desirable for the coating composition prepared by the process of this invention.

The acrylic polymer also contains about 1–5 percent by weight of an $\alpha,\beta$-unsaturated monocarboxylic acid. Typically useful $\alpha,\beta$-ethylenically unsaturated monocarboxylic acids used to prepare the acrylic polymer are acrylic acid, methacrylic acid, crotonic acid, ethacrylic acid, propylacrylic acid, isopropylacrylic acid and the like. Preferred are acrylic acid and methacrylic acid since these acids form a high quality polymer.

One preferred acrylic polymer used in the process of this invention contains 0–18 percent by weight styrene, 25–45 percent by weight methyl methacrylate, 40–43 percent by weight of an alkyl acrylate or an alkyl methacrylate, having two to four carbon atoms in the alkyl group, 8–18 percent by weight of one of the aforementioned hydroxy containing constituents, 1–4 percent by weight of either acrylic acid or methacrylic acid.

Another particularly useful acrylic polymer which gives a high quality coating contains 10–18 percent by weight styrene, 25–30 percent by weight methyl methacrylate, 38–42 percent by weight butyl acrylate, 10–16 percent by weight hydroxyethyl acrylate and 1–3 percent by weight acrylic acid.

Still another particularly useful acrylic polymer contains 40–50 percent by weight methyl methacrylate, 40–48 percent by weight butyl acrylate, 6–10 percent by weight hydroxyethyl acrylate and 3–5 percent by weight acrylic acid.

The other constituent used to prepare the coating composition is a heat reactive condensate which gives the composition its thermosetting characteristic and improves the composition's hardness, solvent resistance, alkali and heat resistance. The resulting composition contains about 5–50 percent by weight, based on the weight of the film-forming polymers, of the heat reactive condensate and preferably, about 10–25 percent by weight of the heat reactive condensate.

Preferred heat reactive condensates used in this invention are alkylolated melamine formaldehyde resins or a mixture of an alkylolated melamine formaldehyde resin and urea formaldehyde. These preferred alkylolated melamine formaldehyde resins have one to four carbon atoms in the alkyl groups and are those that are well known in the art. These resins are prepared by conventional techniques in which a lower alkyl alcohol, such as methanol, ethanol, butanol, isobutanol, propanol, isopropanol and the like, is reacted with the melamine formaldehyde resin to provide pendent alkoxy group or groups. In general, other melamine formaldehyde resins that are methylolated and have three to six methylol groups are useful in the invention. Acid catalysts can be used with the highly alkylolated melamine formaldehyde resins to reduce the curing temperature of the composition. One preferred melamine resin used in this invention, because of its availability and since it forms a high quality coating composition, is an essentially monomeric, partially methylolated melamine formaldehyde. One resin of this type has a molar ratio of melamine/formaldehyde/methanol of about 1/5/3. Another useful resin is hexamethoxymethylol melamine.

The coating compositions prepared according to the process of this invention can be applied to a variety of substrates, for example, wood, glass, plastics, such as polypropylene, styrene copolymers of styrene and the like, by any of the usual application methods, such as spraying, dipping, brushing, flow coating and the like. These coatings are baked at about 125°–175° C. or higher for about 5 to 30 minutes. The resulting coating is about 1–5 mils thick, preferably 1–3 mils thick and can be rubbed or polished in accordance with conventional techniques, if desired, to improve smoothness or apparent gloss or both.

Preferably, the coating composition prepared by the process of this invention is used over a suitably primed metal substrate. Typical alkyd primers or epoxy primers pigmented with iron oxide, carbon black, titanium dioxide and the like can be used. Also, the composition can be used directly over galvanized steel to form a durable coating.

The resulting coatings of the composition of this invention are characterized by increased freedom from water spotting and have excellent craze resistance in combination with outstanding durability and gloss retention. Coatings of this invention also have good gasoline resistance and resistance to aromatic solvents and improved adhesion to metal substrates as compared with conventional acrylic enamels.

Coating compositions prepared by the process of this invention find particular utility in coating articles such as in the auto industry which are mass produced. Also, these coating compositions now make it possible to blend refinished spots with adjacent or overlapping areas which has not been possible with prior art acrylic enamels.

The following example illustrates this invention. The parts and percentages are by weight unless otherwise specified.

EXAMPLE 1

The following ingredients are charged into a Throop Rubber mill, which is a two-roll mill having one roll at 100° C. and the cold roll at about 5° C.:

| | Parts by Weight |
|---|---|
| Magenta quinacridone pigment | 150 |
| Cellulose acetate butyrate solution (27.5% CAB solids in a 2:1 toluene/acetone solids mixture, the CAB has a one-second viscosity measured at 25% solids in a solution of acetone and toluene according to ASTM-D-1343-56 and has a butyryl content of about 53%) | 200 |
| Butyl benzyl phthalate plasticizer | 50 |
| Acrylic polymer solution (60% polymer solids in which the polymer is a methyl methacrylate/butyl acrylate/hydroxy ethyl acrylate/acrylic acid in a weight ratio of 45/43/8/4 and the polymer has a Gardner Holdt viscosity of about Z measured at 25° C.) | 100 |
| Total | 500 |

The above ingredients are premixed and diluted with acetone to form a composition with a thick paste consistency. The paste composition is then charged onto the above described two-roll mill and a current of 6 amperes is applied and the composition is milled for about 20 minutes applying about 120 foot pounds per gram of charge per minute until a pencil bead is formed between the two rolls. The composition is then stripped from the two rolls and as the composition is cooled it breaks into small pieces or chips.

A mill base is prepared by thoroughly blending the following ingredients:

| | Parts by Weight |
|---|---|
| Pigment chips (prepared above) | 17.4 |
| Ethylene glycol monoethyl ether acetate | 26.4 |
| Acetone | 4.0 |
| Cellulose acetate butyrate solution (described above) | 8.7 |
| Acrylic polymer solution (described above) | 43.5 |
| Total | 100.0 |

A resin solution is prepared by blending the following ingredients:

| | Parts by Weight |
|---|---|
| Acrylic polymer solution (described above) | 1490 |
| Melamine resin solution (70% resin solids in which the resin is a partially methylolated melamine/formaldehyde resin, molar ratio of melamine/formaldehyde/methanol is 1.0/5.1/2.8) | 538 |
| Butyl alcohol | 154 |
| Hydrocarbon solvent (boiling point 150–190° C., aniline −28° C.) | 1010 |
| Total | 3200 |

The resulting resin solution has a polymer solids content of about 40 percent by weight.

A coating composition is then prepared by blending the following ingredients:

| | Parts by Weight |
|---|---|
| Resin solution (40% polymer solids prepared above) | 159 |
| Mill base (prepared above) | 23 |
| Solvent (toluene/isopropyl alcohol, weight ratio 5/1) | 100 |
| Total | 282 |

The above prepared coating composition is diluted to a spray viscosity with standard solvents and the composition is sprayed onto a steel panel primed with about 1.5 mil thick coating of epoxidized resin primer pigmented with iron oxide. The panel is baked for 30 minutes at 150° C. and the resulting coating is about 1.8 mils thick, has a high gloss, excellent hardness, is resistant to blistering by high humidity, has excellent resistance to water soaking, is chip resistant and is resistant to solvents and to weathering.

We claim:

1. An improved process for preparing a thermosetting acrylic enamel modified with cellulose acetate butyrate which comprises the following steps:
   1. forming pigment chips by mixing a charge of 20–60 percent by weight of pigment particles, 30–50 percent of cellulose acetate butyrate having a butyryl content of about 45–55 percent by weight and a viscosity at 25° C. of about 1–8 seconds measured according to ASTM–D–1343–56 and about 5–15 percent by weight of an organic plasticizer on a roll mill having one hot roll at about 65°–135° C. and a cold roll at about 0°–30° C. for about 5 to 30 minutes applying about 75–400 foot pounds per gram of charge per minute;
   2. forming a mill base having a solids content of 20–60 percent by weight by dissolving the pigment chips prepared in Step (1) in a composition selected from the group consisting of an organic solvent for said cellulose acetate butyrate and a blend of an acrylic resin compatible with said cellulose acetate butyrate and an organic solvent for the acrylic resin and said cellulose acetate butyrate; and
   3. blending the mill base prepared in Step (2), an acrylic polymer having free hydroxyl groups and carboxyl groups and a melamine/formaldehyde resin which has been at least partially reacted with an aliphatic monohydric alcohol having one to four carbon atoms to form an enamel having a pigment to binder ratio of about 2:100 to 70:100 in which the binder consists essentially of 50–80 percent by weight of said acrylic polymer, 5–50 percent by weight of the cellulose acetate butyrate and 5–50 percent by weight of the melamine formaldehyde resins.

2. The process of claim 1 in which the acrylic polymer consists essentially of
   a. 0–25 percent by weight styrene,
   b. 25–55 percent by weight methyl methacrylate,
   c. 38–48 percent by weight of a soft constituent selected from the group consisting of an alkyl acrylate and an alkyl methacrylate where the alkyl group has two to four carbon atoms;
   d. 5–20 percent by weight of a hydroxy containing constituent selected from the group consisting of a hydroxy alkyl methacrylate and a hydroxy alkyl acrylate wherein the alkyl group contains two to eight carbon atoms; and
   e. 1–5 percent by weight of an $\alpha,\beta$-unsaturated monocarboxylic acid; wherein said acrylic polymer has a relative viscosity of 1.04–1.10 measured at 25° C. in ethylene dichloride according to ASTM–D–445–46–T, Method B.

3. The process of claim 2 in which the $\alpha,\beta$-ethylenically unsaturated monocarboxylic acid is selected from the group consisting of acrylic acid and methacrylic acid.

4. The process of claim 3 in which the melamine/ formaldehyde resin is a methylolated melamine/formaldehyde resin.

5. The process of claim 4 in which the acrylic polymer consists essentially of 10–18 percent by weight styrene, 25–30 percent by weight methyl methacrylate, 38–42 percent by weight butyl acrylate, 10–16 percent by weight hydroxyethyl acrylate and 1–3 percent by weight acrylic acid.

6. The process of claim 4 in which the acrylic polymer consists essentially of 40–50 percent by weight methyl methacrylate, 40–80 percent by weight butyl acrylate, 6–10 percent by weight hydroxyethyl acrylate, 3–5 percent by weight acrylic acid.

7. The process of claim 4 in which the organic plasticizer is a phthalate ester.

8. The process of claim 1 which comprises the following steps:
   1. forming pigment chips by mixing 20–60 percent by weight of pigment particles, 30–50 percent by weight of cellulose acetate butyrate having a butyryl content of 45–55 percent by weight and a viscosity at 25° C. of about 1–6 seconds measured according to ASTM–D–1343–56 and about 5–15 percent by weight of butyl benzyl phthalate plasticizer on a two-roll mill having the hot roll at about 90–110° C. and the cold roll at about 0°–10° C. for about 15 to 20 minutes apply 120–200 foot pounds per gram of charge per minute;
   2. forming a mill base having a 20 to 60 percent solids content by dissolving the pigment chips prepared in Step (1) in an organic solvent;
   3. blending the mill base with an acrylic polymer, a partially methylolated melamine formaldehyde resin to form an enamel having a pigment to binder ratio of about 2:100 to 70:100 in which the binder consists essentially of 55 to 70 percent by weight of the acrylic polymer, 10 to 30 percent by weight of cellulose acetate butyrate and 10 to 25 percent by weight of the methylolated melamine formaldehyde resin wherein said acrylic polymer consists essentially of
   a. 0–18 percent by weight styrene,
   b. 25–45 percent by weight methyl methacrylate,
   c. 40–43 percent by weight of an alkyl acrylate in which the alkyl group has two to four carbon atoms;

d. 8–18 percent weight of a hydroxy containing constituent selected from the group consisting of a hydroxy alkyl acrylate and a hydroxy alkyl methacrylate, wherein the alkyl group has two to four carbon atoms;

e. 1–4 percent by weight of an $\alpha,\beta$-unsaturated monocarboxylic acid selected from the group consisting of acrylic acid and methacrylic acid; wherein the acrylic polymer has a relative viscosity of 1.06–1.09.

* * * * *